United States Patent [19]

Zhagatspanian et al.

[11] 3,772,172

[45] Nov. 13, 1973

[54] METHOD OF REMOVING HYDROGEN FROM CHLORINE GAS

[76] Inventors: Rafael Vachaganovich Zhagatspanian, 4, Dubrovsky per, 23, kv. 10; Leonid Markovich Yakimenko, Abelmanovskaya, ul., 7, kv. 17; Jury Grigorievich Lyaskin, ul. Vavilova, 17, kv. 24; Mikhail Tikhonovich Filippov, 4 Veshnyakovsky proezd, 5, korp. 4, kv. 122; Viktor Ivanovich Zetkin, ul. Shosse Entuziastov, 121-D, kv. 21, all of Moscow, U.S.S.R.

[22] Filed: Oct. 29, 1971

[21] Appl. No.: 193,699

Related U.S. Application Data

[63] Continuation-in-part of Ser. No. 78,554, Oct. 6, 1970, abandoned, which is a continuation of Ser. No. 626,697, March 29, 1967, abandoned.

[52] U.S. Cl. .......................................... 204/157.1 H
[51] Int. Cl. ............................. B01j 1/14, B01j 1/10
[58] Field of Search .............. 204/157.1 R, 157.1 H, 204/158 HE

[56] References Cited

UNITED STATES PATENTS

| | | | |
|---|---|---|---|
| 3,092,561 | 6/1963 | Lampe | 204/157.1 H |
| 3,201,337 | 8/1965 | Eicheberger et al. | 204/157.1 R |
| 3,256,299 | 6/1966 | Mark | 204/158 HE |
| 3,507,760 | 4/1970 | Levy | 204/158 HE |
| 3,629,081 | 12/1971 | Carpenter | 204/157.1 H |

OTHER PUBLICATIONS

Martin, Chemical & Engineering News April 1955 pp. 1424–8

*Primary Examiner*—F. C. Edmundson
*Attorney*—Eric H. Waters et al.

[57] ABSTRACT

A method of purifying chlorine by the removal of hydrogen which is characterized in that chlorine containing molecular hydrogen is irradiated with electrons having an energy of 0.5 to 5 M.e.v. The hydrogen chloride formed as a result of the reaction of chlorine and hydrogen is removed.

1 Claim, No Drawings

METHOD OF REMOVING HYDROGEN FROM CHLORINE GAS

The present application is a continuation-in-part of application Ser. No. 78,554 filed Oct. 6, 1970, and now abandoned, the latter in turn being a continuation of application Ser. No. 626,697 filed Mar. 29, 1967 and also now abandoned.

The present invention relates to gas purification by removing undesirable impurities. In this case it relates to the removal of hydrogen from chlorine. Hydrogen is an undesirable impurity in chlorine gas, which is produced by the electrolysis method. The presence of hydrogen in chlorine gas, on the one hand, makes it impossible to liquefy it completely, and on the other hand creates a dangerous explosive condition during compression (condensation, liquefaction).

There is known a photochemical method for the removal of the hydrogen from chlorine which is characterized in that chlorine containing hydrogen is irradiated with ultraviolet light (U.S. Pat. No. 3,201,337, Aug. 17, 1965).

The shortcoming of this method is the low penetrating power of the ultraviolet radiation into the chlorine.

Another shortcoming is that during the processing of industrial electrolytic chlorine gas, there unavoidably forms on the ultraviolet lamps a coating opaque to U.V.light, which decreases the effectiveness of irradiating chlorine gas and necessitates cleaning the surfaces of the lamps periodically.

It is possible to use short wave electromagnetic radiation such as alpha-rays and gamma-rays in place of ultraviolet radiation (U.S. Pat. No. 3,256,299 of July 14, 1966). This type of ionizing radiation, just as U.V.light, can initiate the reaction between hydrogen and chlorine, and because of the high penetrating power is not dependent on the optical properties of the medium, and does not have the above mentioned shortcomings of the photochemical method.

However the industrial use of gamma rays for carrying out gaseous reactions is not economically advantageous, since in this case the use of gamma rays is very ineffective in energy utilization and hence requires large expenditures concerne with the radiation sources.

In principle, the reaction of hydrogen with chlorine can be initiated by other types of radiation, such as the alpha and beta rays of radioactive isotopes. However alpha-rays, obviously can not be used in practice because of their very low penetrating power, even in gases.

At the present time technological methods have not yet been found for the utilization of beta-rays. The problem of protecting beta-ray sources against corrosive media as well as the problem of producing beta-ray sources with high activity and large surfaces have not been solved. Besides this, the use of powerful beta-ray source on an industrial scale is accompanied by the risk of contaminating the products with radioactivity.

An object of the present invention is to provide a method of purifying chlorine with the removal of hydrogen which will be free of the shortcomings of the known methods or such methods which in principle may be carried out.

The present method, according to the invention, consists in the irradiation of gaseous chlorine, containing hydrogen as an impurity, with accelerated electrons. By the term accelerated electrons we mean electrons which were given additional energy above 10 ev in an electrical or magnetic field. The preferred acceleration of electrons in the process of the removal of hydrogen from chlorine is in the range 0.5 – 5 M.e.v.

The lower enegy level is determined by the energy requirements for introducing the electrons into the irradiated reaction volume. Electrons with less than 0.5 M.e.v. expend a considerable part of their energy in passing through the entrance window of the reactor. Using electrons with energy more than 5 Mev makes it difficult to service the system safely.

In the reactor, the fast electrons initiate the reaction of chlorine with hydrogen. The hydrogen chloride which is formed may then be separated from the chlorine gas by any known method, such as solution in water.

The accelerated electrons with energies in the range described are generated with the help of an electron accelerator of a type known at the present time and the electrons are introduced into the reactor through a window closed with thin metal foil.

The present method retains all the advantages that penetrating radiation has over U.V. radiation. The method is superior to one using X-rays since the radiation energy is used more effectively. On using the present method the problem of corrosion resistance is readily solved and also there is no possibility of contaminating the products with radioactivity.

Additionally, the technology of producing electron accelerators at the present time is so developed that carrying out the proposed method does not present any serious difficulties. The use of accelerated electrons for the removal of hydrogen from chlorine is illustrated by the following examples.

EXAMPLE 1

A dry artificial mixture of gases, containing 97.5 percent by volume of chlorine, 2.4 percent hydrogen and no more than 0.1 percent air is irradiated with electrons with an energy of 0.95 – 1.0 Mev. in a glass reaction vessel with a diameter of 150 mm, and a length of 1,000 mm. The electron ray was generated with an impulse accelerator which had a frequency of 25 c.p.s., and an impulse period of 1.2 microsec. and is introduced into the reaction chamber through a window opening closed with nickel foil of thickness 50 micr. The average dose introduced into the chamber as determined with a $NO_2$ dosimeter was $3.5 \pm 0.5$ krad/sec. The mixture of gases is pumped through the reaction chamber with a circulation pump at a volume rate of about 100 liters/min, its composition was analyzed chromatographically. The results of the analysis and the value of the radiochemical yield in the hydrogen separation is given in Table 1.

TABLE 1

| Time of irradiation min | Concentration of $H_2$ vol.% | G (Molecules $H_2$/ 100 e.v.) |
|---|---|---|
| 0 | 2.4 ±0.1 | — |
| 1 | 2.0 ±0.1 | 240 ±50 |
| 2 | 1.55 ±0.1 | 250 ±50 |
| 4 | 1.2 ±0.1 | 180 ±50 |
| 8 | 0.5 ±0.1 | 140 ±50 |

EXAMPLE 2

A mixture of gases with the same composition as the previous example flows through a cylindrical reaction vessel with a diameter of 40 mm and a length of 200 mm made of nickel foil with a thickness of 50 micr. The electron ray with the same parameters as in the preceding example, was introduced into the reaction volume through the side wall of the reaction vessel. The residence time of the mixture of gases in the irradiated reaction space was regulated by changing the flow rate of the gas mixture. The magnitude of the irradiation in the reaction space is regulated by changing the flow rate of the electrons which strike the reactor wall. The mixture of gases leaving the reaction chamber was analyzed chromatorgraphically. The results of the analysis are given in Table II.

Table II

| Residence Time sec. | Concentration of $H_2$ at the exit of the reactor % Current microamp. | | | |
|---|---|---|---|---|
| | 1.5 | 3 | 6 | 12 |
| 0 | 2.4 ±0.1 | 2.4 ±0.1 | 2.4 ±0.1 | 2.4 ±0.1 |
| 4 | 1.5 ±0.1 | 1.2 ±0.1 | 1.1 ±0.1 | |
| 8 | 1.4 ± 0.1 | 0.8 ±0.1 | 0.48 ±0.05 | |
| 16 | 1.4 ±0.1 | 0.55 ±0.05 | 0.24 ±0.05 | 0.12 ±0.02 |

As shown in the given examples, the concentration of hydrogen in chlorine may be lowered to any desired degree by increasing the residence time in the irradiated space and the dosage.

What is claimed is:

1. A method for removing hydrogen impurities from gaseous chlorine which comprises irradiating gaseous chlorine containing hydrogen impurities for a time not exceeding several minutes with a beam of electrons whose energy has been raised to a level of 0.5–5 Mev in an accelerator, and separating from the gaseous chlorine hydrogen chloride which is formed.

* * * * *